Feb. 25, 1964     D. G. GRIEG     3,122,719

DISTANCE MEASURING DEVICE

Filed June 13, 1960

DONALD D. GRIEG
INVENTOR.

BY *Albert T Sperry*

ATTORNEY

United States Patent Office 3,122,719
Patented Feb. 25, 1964

3,122,719
DISTANCE MEASURING DEVICE
Donald D. Grieg, Grandview Ave., North Caldwell, N.J.
Filed June 13, 1960, Ser. No. 35,673
6 Claims. (Cl. 340—1)

This invention relates to position indicators and is particularly directed to novel position indicators for use in locating the position of underwater objects from small fishing boats, pleasure yachts and the like.

It is frequently necessary or desirable for the operators of small fishing boats or the like to be able to locate the position of underwater objects, such as submerged reefs, sunken ships, schools of fish or the depth of the water. Moreover, it is desirable to be able to locate these both with respect to depth and with respect to the distance from the boat. It is also desirable, when operating a boat, at night or in a fog, to be able to determine the distance from shore or from nearby boats or other obstructions. When anchoring, it is also important to have means of determining whether there is drifting or dragging anchor with respect to some fixed point such as the shoreline.

Radar and other position-indicating equipment which are often found on large ships are too heavy, too large, require too much power and are too expensive for use on small fishing boats or pleasure boats. In addition, means such as radar are unable to detect underwater obstacles. Some small, low power apparatus has been designed for small boats which will indicate depth. However, heretofore, no device has been provided for small boats which will indicate both depth and distance.

These disadvantages of prior art systems are overcome with the present invention and novel position-indicating means are provided which yield substantially simultaneous indications of both depth and distance. Moreover, the device of the present invention is compact, lightweight and inexpensive.

The advantages of the present invention are preferably attained by providing ultrasonic signal-generating means together with electroacoustic transducing means positioned to direct signals to obtain depth and distance indications. In addition, novel signal-receiving and indicating means are provided which afford substantially simultaneous indications of depth and distance.

Accordingly, it is an object of the present invention to provide novel depth and distance-indicating means which is compact, lightweight and inexpensive.

Another object of the present invention is to provide novel depth and distance-indicating means which provides substantially simultaneous indications of both depth and distance.

A specific object of the present invention is to provide novel position-indicating means comprising ultrasonic signal-generating means, electroacoustic transducing means positioned to direct signals for obtaining depth and distance indications, signal-receiving means and means for providing substantially simultaneous indications of the signals received.

These and other objects and features of the present invention will be apparent from the following detailed description wherein reference is made to the figures of the accompanying drawings.

Figure 1:
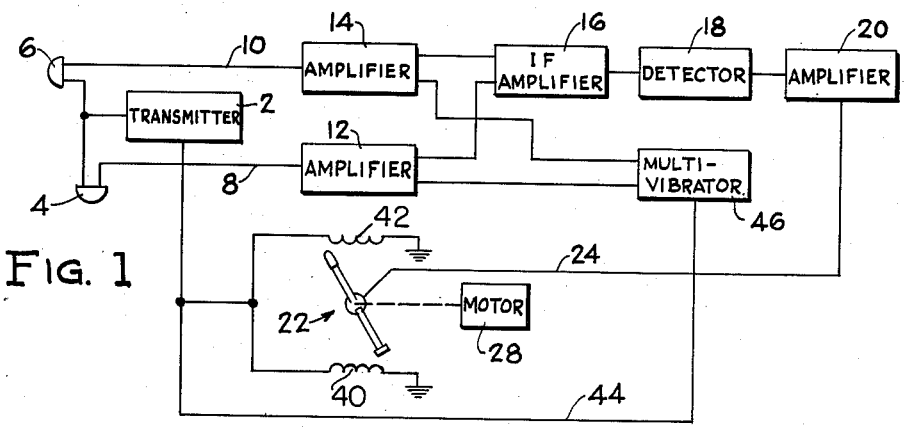
FIG. 1 is a diagrammatic representation of a typical position-indicating device embodying the present invention.

In those forms of the present invention chosen for purposes of illustration in the drawings, FIG. 1 shows a pulse transmitter 2 which generates electrical pulses at an ultrasonic frequency, as an illustration, such as 200 to 300 kilocycles per second and which is periodically triggered to pass these pulses to suitable transducers 4 and 6. Transducers 4 and 6 convert the electrical pulses to acoustic pulses for transmission through the water. Moreover, transducer 4 is mounted to transmit pulses downward to measure depth while transducer 6 is mounted to transmit pulses horizontally to measure distance from shore or other nearby objects. The acoustic signals emitted by transducers 4 and 6 will travel through the water at a speed of approximately 4,500 feet per second and will be reflected by any object which they encounter, whereupon the signals will return to the transducers 4 and 6 and will be reconverted into electrical signals which will be passed through conductors 8 and 10 to suitable amplifiers 12 and 14. As shown, signals from depth transducer 4 will be passed by conductor 8 to amplifier 12 while signals from distance transducer 6 will be passed by conductor 10 to amplifier 14.

From the amplifiers 12 and 14, the signals are passed to a common amplifier 16 and thence to a demodulator or detector 18. Thereafter, the demodulated signal is amplified by amplifier 20 and is applied to an indicating device 22 through conductor 24.

Figure 2:
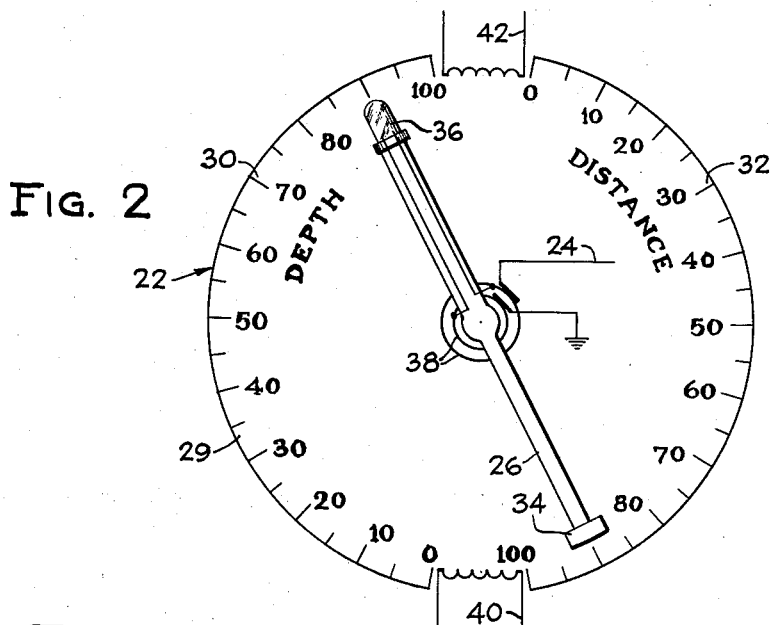
FIG. 2 is a diagrammatic representation of the triggering and indicating apparatus of the position-indicating device of FIG. 1.

As best seen in FIG. 2, the indicator 22 also serves as a triggering device to cause transmitter 2 to pass a pulse to the transducers 4 and 6. The indicator 22 comprises a rotor 26 which is driven by a constant speed motor 28. The rotor 26 is rotated about a dial 29 which is divided into two scales 30 and 32. Scale 30 provides an indication of depth while scale 32 provides an indication of distance.

Rotor 26 carries a magnet 34 at one end thereof and an indicator lamp, such as neon tube 36, at the opposite end thereof. The lamp 36 is connected through slip rings 38 to conductor 24 and ground so that the lamp 36 will be lighted whenever a pulse is applied to conductor 24 by amplifier 20.

To trigger the system, inductive windings 40 and 42 are provided adjacent the zero points of the scales 30 and 32. Whenever magnet 34 passes one of these windings 40 and 42, an electrical pulse will be generated in the respective winding and this pulse will be passed by conductor 44 to the transmitter 2 and to a multivibrator 46 which serves to turn the amplifiers 12 and 14 on and off alternately so as to pass only the appropriate signal to the common amplifier 16 and, thence, to indicator lamp 36.

In operation, as indicator lamp 36 passes the zero point of depth scale 30, magnet 34 passes winding 42 causing a pulse to be applied through conductor 44 to transmitter 2 and multivibrator 46. Multivibrator 46 acts to turn on amplifier 12 and to turn off amplifier 14. At the same time, transmitter 2 sends an electrical pulse to transducers 4 and 6 which convert the electrical pulse to acoustic pulses. Transducer 4 directs an acoustic pulse downwardly to measure depth while transducer 6 directs an acoustic pulse horizontally to measure distance. The acoustic pulse from transducer 4 will be reflected from the bottom underlying the water or from a sunken ship, school of fish or other articles below the boat and will be reflected back to transducer 4. Meanwhile, the acoustic pulse from transducer 6 will be reflected by the shore or by nearby boats or other articles near the surface of the water and will be reflected back to transducer 6. The returning acoustic pulses will be reconverted to electrical pulses by the transducers 4 and 6. Transducer 4 will apply its signals to amplifier 12 through conductor 8 while transducer 6 will apply its signals to amplifier 14 through conductor 10. However, as noted above, multivibrator 46 has turned amplifier 14 off. Thus, the signals from distance transducer 6 will be blocked while the signals from depth transducer 4 which were applied to amplifier 12 will be passed. These signals will, thus, be applied through amplifier 16 to demodulator 18 and will then be passed through amplifier 20 and conductor 24 to light the indicator lamp 36. However, while the acoustic pulse has been traveling out from and back to transducer 4, motor 28 has been rotating rotor 26 causing the indicator lamp 36 to sweep along scale 30. Thus, when the returning acoustic pulse is received by transducer 4, it will be converted to an electrical pulse which passes through amplifiers 12 and 16, demodulator 18 and amplifier 20 and will cause the indicator lamp 36 to flash at a point along scale 30 corresponding to the depth of the article which reflected the signal.

In some instances, the signal from transducer 4 will be reflected by articles at more than one depth. For example, the signal may be reflected by a school of fish and also from the bottom. In such cases, more than one reflected signal will be received by transducer 4. However, these signals will be spaced apart by the time required for the signals to travel the distance between the articles. Therefore, the reflected signals will cause the indicator lamp 36 to flash more than once at various points along the depth scale 30. It will be obvious that intermediate signals indicated along the depth scale may be caused by various objects. On the other hand, the last signal will always be that reflected from the bottom.

When the movement of rotor 26 has caused the indicator lamp 36 to completely traverse the depth scale 30, it will begin to traverse the distance scale 32. At the same time, magnet 34 will pass winding 40. As a result, winding 40 will generate an electrical pulse which will be passed by conductor 44 to transmitter 2 and multivibrator 46. Consequently, multivibrator 46 will switch off amplifier 12 and will switch on amplifier 14. Meanwhile, transmitter 2 will pass another pulse to transducers 4 and 6 which will be converted to acoustic pulses and will be transmitted in the same manner as the first pulse from transmitter 2. Moreover, as before, the reflected acoustic pulses will be received by transducers 4 and 6 and will be reconverted to electrical pulses which will be applied to the respective amplifiers 12 and 14. However, multivibrator 46 has now switched off amplifier 12 and has switched on amplifier 14. Therefore, the signal from depth transducer 4 will now be blocked while the signals from distance transducer 6 which were applied to amplifier 14 will be passed. These signals will now be amplified by amplifier 16 and demodulated by demodulator 18 and will be applied through amplifier 20 and conductor 24 to light the indicator lamp 36 at an appropriate position along the distance scale 32.

As described above with respect to the depth signals, more than one reflected signal may be received by the distance transducer 6, as when there are other boats between the boat carrying the device of the present invention and the shore. These signals will cause the indicator lamp 36 to flash at points along the distance scale 32 corresponding to the distance of the respective objects from the boat carrying the device of the present invention. The last signal to be indicated by indicator lamp 36 during the "distance" portion of the cycle will be that reflected from the shore.

Thus, each time rotor 26 makes a complete revolution about the dial 29, measurements of both depth and distance will be provided. Moreover, if rotor 26 is made to rotate at a rate of about ten revolutions per second, the depth and distance indications will appear to be simultaneous and continuous since the human eye retains an image for about one-tenth of a second.

Figure 3:
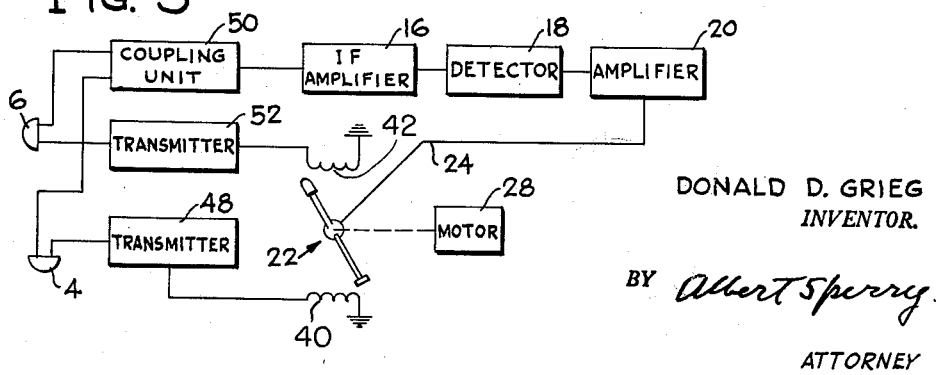
FIG. 3 is a diagrammatic representation of a modified form of the position-indicating device of FIG. 1.

FIG. 3 illustrates a modified form of the position-indicating device of the present invention in which two transmitters are provided. As shown, transmitter 48 is triggered by the pulse generated in winding 42 of the triggering and indicating device 22 upon passage of magnet 34 on the rotor 26. When triggered, transmitter 48 applies an electric signal to depth transducer 4 which converts the electric signal to an acoustical signal. Upon receipt of a selected signal, transducer 4 reconverts the acoustical signal to an electrical signal and passes it to a suitable coupling unit 50. Thereafter, the signal is passed through amplifier 16, demodulator 18 and amplifier 20 and is applied through conductor 24 to light the lamp 36 of the indicating and triggering device 22, in the manner described above with respect to FIGS. 1 and 2.

Upon completing the depth measurement, magnet 34 passes winding 40 which generates a pulse to trigger transmitter 52. Transmitter 52 then applies an electrical signal to distance transducer 6 which converts the electrical signal to an acoustical signal for the distance measurement. Reflected acoustic signals are subsequently received by transducer 6 and are reconverted into electrical signals and are passed to the coupling unit 50. Thereafter, the signals are passed through the common portions of the circuit to light the indicator lamp 36, in the manner heretofore described.

If desired, transmitters 48 and 52 may be made to emit signals of different frequencies to aid in discrimination of echos. The coupling unit 50 may also be keyed to the inductive windings 40 and 42 so as to pass only signals of the appropriate channel during any portion of the cycle of operation similar to that described in conjunction with FIG. 1.

Numerous other variations and modifications of the present invention may obviously be made without departing from the invention. For example, the indicator may be a cathode ray tube or other purely electronic device in place of the electro-mechanical illustration used. It is also clearly understood that the two transducers may be incorporated into a single housing without altering the performance. Accordingly, it should be clearly understood that the forms of the invention described above and shown in the figures of the accompanying drawing are illustrative only and are not intended to limit the scope of the invention.

I claim:

1. Position-indicating apparatus comprising signal-transmitting means, first transducer means for converting signals from said transmitting means to acoustic signals directed in a first direction and for subsequently receiving reflected acoustic signals from said first direction and reconverting said reflected acoustic signals to electrical signals, second transducer means for converting signals from said transmitting means to acoustic signals directed in a second direction and for subsequently receiving reflected acoustic signals from said second direction and reconverting said reflected acoustic signals to electrical signals, a first amplifier for receiving and amplifying electrical signals from said first transducer, a second amplifier for receiving and amplifying electrical signals from said second transducer, a common detection circuit connected to receive signals from said first and second amplifiers, said detection circuit including an initial amplifier, demodulating means and a final amplifier, indicating means for receiving electrical signals from said detection circuit and for indicating receipt of said electrical signals as a function of distance, said indicating means comprising a dial face, a depth scale formed on a portion of said dial face, a distance scale formed on another portion of said dial face, a rotor mounted for rotation about said dial face, means for causing said rotor to rotate at a constant rate, an indicating lamp carried on one end of said rotor, means connected to receive signals from said detection circuit and to cause said lamp to flash to indicate receipt of said signals as a function of distance, a magnet carried by the opposite end of said rotor, a first inductive winding positioned adjacent the zero position of said depth scale, a second inductive winding positioned adjacent the zero position of said distance scale, means for passing electrical pulses generated by said windings upon passage of said magnet thereby to said transmitting means to cause said transmitting means to pass electrical pulses to said transducers, and means connected to receive electrical pulses from said windings and operable upon receipt of said electrical pulses to switch said first and second amplifiers on and off alternately with respect to each other.

2. Position-indicating apparatus comprising a first signal transmitting means, a first transducer for converting signals from said first transmitting means to acoustic signals directed in a first direction and for subsequently receiving reflected acoustic signals from said first direction and reconverting said reflected acoustic signals to electrical signals, second signal transmitting means, second transducer means for converting signals from said second transmitting means to acoustic signals directed in a second direction and for subsequently receiving reflected acoustic signals from said second direction and reconverting said reflected acoustic signals to electrical signals, a coupling unit for receiving signals from said transducers, a common detection circuit connected to receive signals from said coupling unit, indicating means for receiving electrical signals from said detection circuit and having a single energizable element movable with respect to a calibrated surface for indicating receipt of said electrical signals as a function of distance, and triggering means synchronized with said indicating means to cause said first and second transmitting means to be triggered alternately.

3. The device of claim 2 wherein said indicating means comprises a dial face, a depth scale formed on a portion of said dial face, a distance scale formed on another portion of said dial face, a rotor mounted for rotation about said dial face, means for causing said rotor to rotate at a constant rate, an indicating lamp carried by one end of said rotor, means connected to receive signals from said detection circuit and to cause said lamp to flash to indicate receipt of said signals as a function of distance, a magnet carried by the opposite end of said rotor, a first inductive winding positioned adjacent the zero position of said depth scale, a second inductive winding positioned adjacent the zero position of said distance scale, means for passing electrical pulses generated in said first winding upon passage of said magnet to cause said first transmitting means to pass signals to said first transducer, and means for passing electrical pulses generated in said second winding upon passage of said magnet to cause said second transmitting means to pass signals to said second transducer.

4. A distance indicating means comprising a first and second signal generating and receiving means, transmitter means coupled to said signal generating and receiving means energizable to cause said signal generating and receiving means to generate signals, receiver means coupled to said signal generating means to receive signals received by said signal generating and receiving means, a dual signal display means connected to said receiver means, and control signal generating means connected to said transmitting means to energize said transmitter means in accordance with a predetermined sequence, said receiving means including common detector means for passing signals received by both of said first and second signal generating and receiving means, said dual signal display means having a single energizable element connected to said detector means, said single energizable element being rotated in synchronism with said control signal generating means whereby said single energizable element displays signals received by both of said first and second signal generating and receiving means.

5. In combination, a first and second transducer means, generating and receiver circuit means connected to said first and second transducer means for causing said first and second transducer to respectively generate signals and sense the reflections of said signals, a dual display means having a single energizable element movable with respect to a calibrated surface, and circuit means for synchronously rendering one of said first or second transducers inoperative for passing signals through said receiver means while rendering the other of said first or second transducers operative to pass signals through said receiver means, said receiver means including common detection means for detecting reflection signals generated by both of said first and second transducers, said common detection means being connected to said single energizable element to display the signals detected by each of said first and second transducers with respect to said calibrated surface.

6. A position indicating means for simultaneously displaying a first and second parameter, said position indicating means comprising a first and second transducer means, energizing means connected to said first and second transducer means to drive said transducer means to transmit energy, receiver means for receiving energy generated by said first and second transducer means due to reflected portions of their transmitted energy, and a dual display means said dual display means having a single energizable element, said single energizable element being connected to said receiver means, said dual display means having a first display portion for displaying information related to energy generated by said first transducer and a second display portion for displaying information related to energy generated by said second transducer means, said single energizable element being moved with respect to said first and second display portions and being energized at locations along said first and second display portions corresponding to said first and second parameters respectively.

References Cited in the file of this patent

UNITED STATES PATENTS

| 2,225,046 | Hunter | Dec. 17, 1940 |
| 2,412,003 | Neufeld | Dec. 3, 1946 |
| 2,423,024 | Hershberger | June 24, 1947 |
| 2,750,574 | Fryklund | June 12, 1956 |

FOREIGN PATENTS

| 522,890 | Great Britain | July 1, 1940 |
| 622,098 | Great Britain | Apr. 27, 1949 |
| 650,447 | Great Britain | Feb. 21, 1951 |